(12) United States Patent
Chen et al.

(10) Patent No.: US 10,534,144 B1
(45) Date of Patent: Jan. 14, 2020

(54) OPTICAL TRANSCEIVER

(71) Applicant: Prime World International Holdings Ltd., New Taipei (TW)

(72) Inventors: Yu Chen, New Taipei (TW);
Hsuan-Chen Shiu, New Taipei (TW);
Che-Shou Yeh, New Taipei (TW)

(73) Assignee: Prime World International Holdings Ltd., New Taipei (TW)

( * ) Notice: Subject to any disclaimer, the term of this patent is extended or adjusted under 35 U.S.C. 154(b) by 0 days.

(21) Appl. No.: 16/415,635

(22) Filed: May 17, 2019

(51) Int. Cl.
*H05K 5/00* (2006.01)
*G02B 6/42* (2006.01)
*H04B 10/40* (2013.01)

(52) U.S. Cl.
CPC ........... *G02B 6/4261* (2013.01); *H04B 10/40* (2013.01)

(58) Field of Classification Search
CPC ...................................................... H05K 5/00
See application file for complete search history.

(56) References Cited

U.S. PATENT DOCUMENTS

| | | | |
|---|---|---|---|
| 6,430,053 B1 * | 8/2002 | Peterson | H01R 13/6335 361/728 |
| 2004/0101257 A1 * | 5/2004 | Kruger | G02B 6/3897 385/92 |

* cited by examiner

*Primary Examiner* — Jerry Wu
(74) *Attorney, Agent, or Firm* — Grossman Tucker Perreault & Pfleger, PLLC

(57) ABSTRACT

An optical transceiver includes a housing, a fastening component, a bail and an optical connector. The fastening component is movably disposed on the housing and configured to be detachably fastened with the cage. The bail includes a first connecting portion and a second connecting portion. The first connecting portion is pivoted with respect to the fastening component at a first pivot joint, and the second connecting portion is pivoted with respect to the fastening component at a second pivot joint. The optical connector is disposed in the housing and located between the first pivot joint and the second pivot joint.

7 Claims, 7 Drawing Sheets

US 10,534,144 B1

OPTICAL TRANSCEIVER

BACKGROUND

1. Technical Field

The disclosure relates to an optical communication device, more particularly to a pluggable optical transceiver.

2. Related Art

Optical transceivers are generally installed in electronic communication facilities in modern high-speed communication networks. In order to make flexible the design of an electronic communication facility and less burdensome the maintenance of the same, an optical transceiver is inserted into a corresponding cage that is disposed in the communication facility in a pluggable manner. In order to define the electrical-to-mechanical interface of the optical transceiver and the corresponding cage, different form factors such as XFP (10 Gigabit Small Form Factor Pluggable) used in 10 GB/s communication rate, QSFP (Quad Small Form-factor Pluggable), or others at different communication rates have been made available.

A fastening mechanism is provided for securely fixing the optical transceiver to the cage. On the other hand, the optical transceiver must include a releasing mechanism so that the optical transceiver could be released from the cage smoothly when necessary.

SUMMARY

According to one aspect of the present disclosure, an optical transceiver configured to be inserted into a cage in pluggable manner is disclosed. Such disclosed optical transceiver in one embodiment includes a housing, a fastening component, two pivot shafts and a bail. The fastening component is movably disposed on the housing and configured to be detachably fastened with the cage. The two pivot shafts are separately disposed on the fastening component, and the two pivot shafts are respectively located on opposite sides of the housing. The bail includes a first connecting portion and a second connecting portion, the first connecting portion is pivoted with respect to the fastening component via one of the two pivot shafts, and the second connecting portion is pivoted with respect to the fastening component via the other one of the two pivot shafts.

According to another aspect of the present disclosure, an optical transceiver configured to be inserted into a cage in pluggable manner is disclosed. Such disclosed optical transceiver in one embodiment includes a housing, a fastening component and a bail. The fastening component is movably disposed on the housing and configured to be detachably fastened with the cage. The bail includes a first connecting portion and a second connecting portion, the first connecting portion is pivoted with respect to the fastening component at a first pivot joint, and the second connecting portion is pivoted with respect to the fastening component at a second pivot joint. A connection line between the first pivot joint and the second pivot joint passes through the housing.

BRIEF DESCRIPTION OF THE DRAWINGS

The present disclosure will become more fully understood from the detailed description given below and the accompanying drawings which are given by way of illustration only and thus are not intending to limit the present disclosure and wherein.

DETAILED DESCRIPTION

Figure 1:
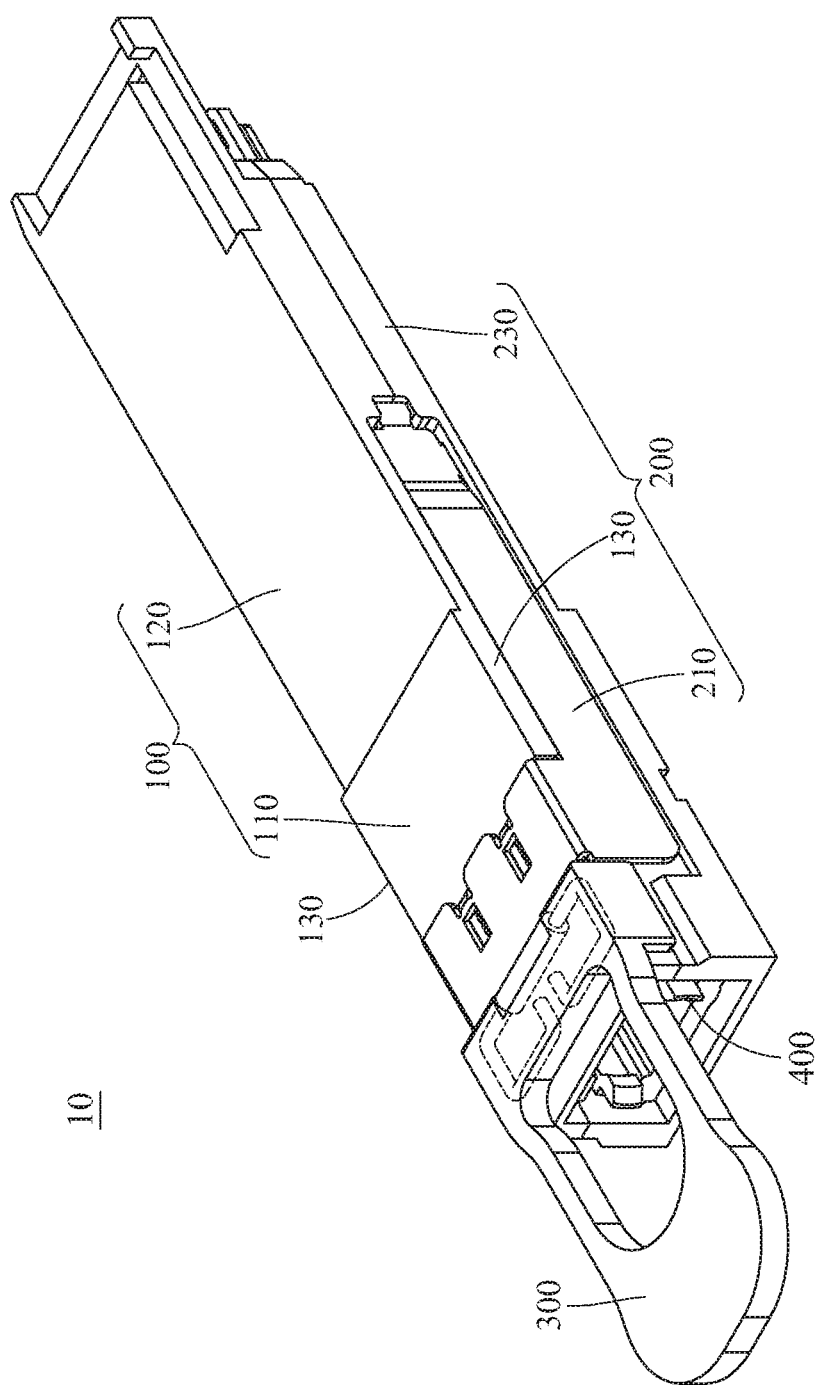
FIG. 1 is a perspective view of an optical transceiver according to a first embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
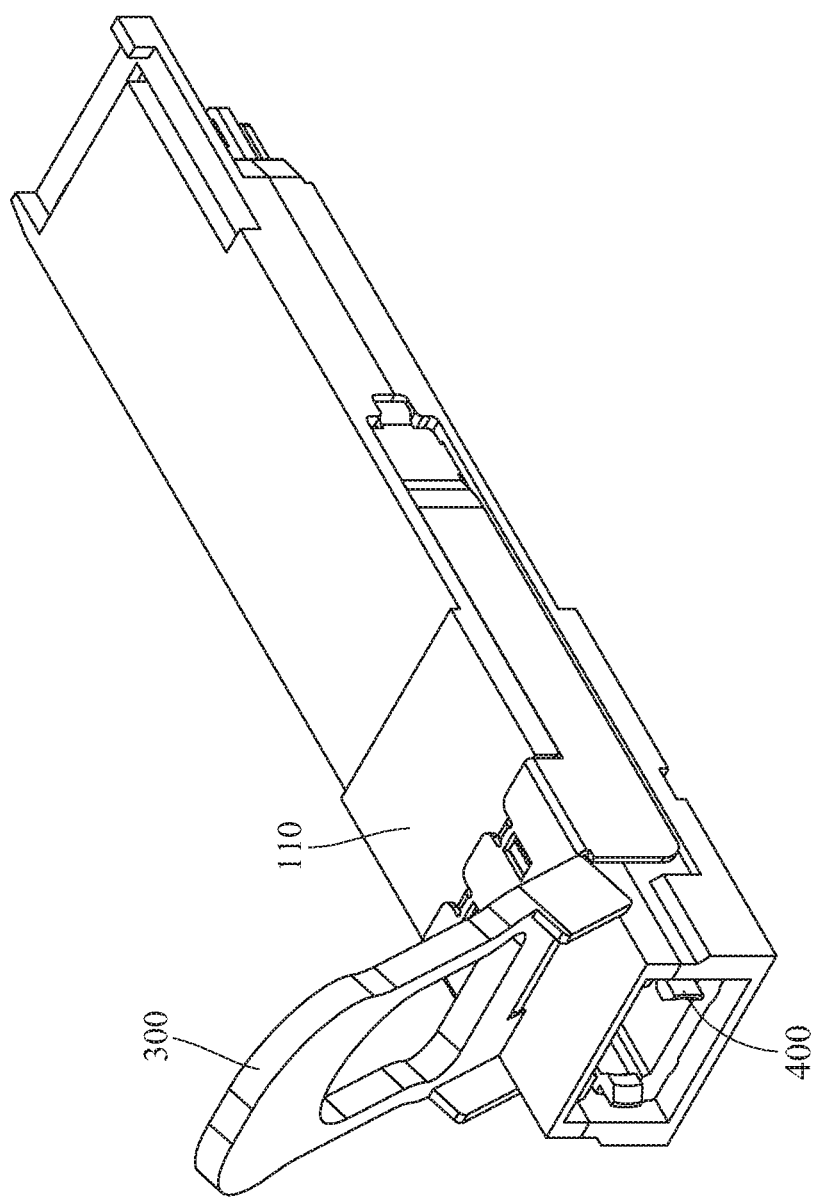
FIG. 2 is a perspective view of the optical transceiver in FIG. 1, with a bail at an upright position.

Please refer to FIG. 1 and FIG. 2. FIG. 1 is a perspective view of an optical transceiver according to a first embodiment of the present disclosure. FIG. 2 is a perspective view of the optical transceiver in FIG. 1, with a bail at an upright position. In this embodiment, an optical transceiver 10 is disclosed, and the optical transceiver 10, for example is a QSFP-DD (Quad Small Form-factor Pluggable Double Density) optical transceiver which could be inserted into a cage (not shown in the drawings) in pluggable manner. The optical transceiver 10 includes a housing 100, a fastening component 200, a bail 300 and an optical connector 400 to which an optical jumper (not shown in the drawings) could be inserted.

The housing 100 includes a head portion 110 and an insertion portion 120 connected with each other. The insertion portion 120 is configured to be inserted into the cage. The head portion 110 of the housing 100 includes two lateral surfaces 130. A sliding rail is formed on each of the two lateral surfaces 130 and extends from the head portion 110 to the insertion portion 120.

The fastening component 200 includes two extending arms 210 movably disposed on the sliding rails at the lateral surfaces 130, respectively. Each of the extending arms 210 includes a fastening portion 230 corresponding to a plugging slot of the cage. The fastening component 200 is movable relative to the housing 100, such that the optical transceiver 10 is readily and reliably inserted into the cage by the fastening portion 230.

The bail 300 is pivoted with respect to the fastening component 200. The bail 300 is in front of the head portion 110 or on the top of the head portion 110. The optical connector 400, for example, is an optical fiber terminal (e.g., the optical jumper) disposed in the head portion 110 of the housing 100.

As shown in FIG. 2, the bail 300 could be moved with respect to the pivot allowing for the optical fiber terminal to be plugged into the optical connector 400 more conveniently.

Since the trend of evolution of the optical transceiver somewhat focuses on the reduction in size of the entire transceiver as well as high density of channels, an optical connector that is larger in size for receiving more optical fiber terminals is needed. At the same time, that optical connector may increase the height of the optical transceiver, making difficult meeting the requirement of small form factors.

Figure 3:
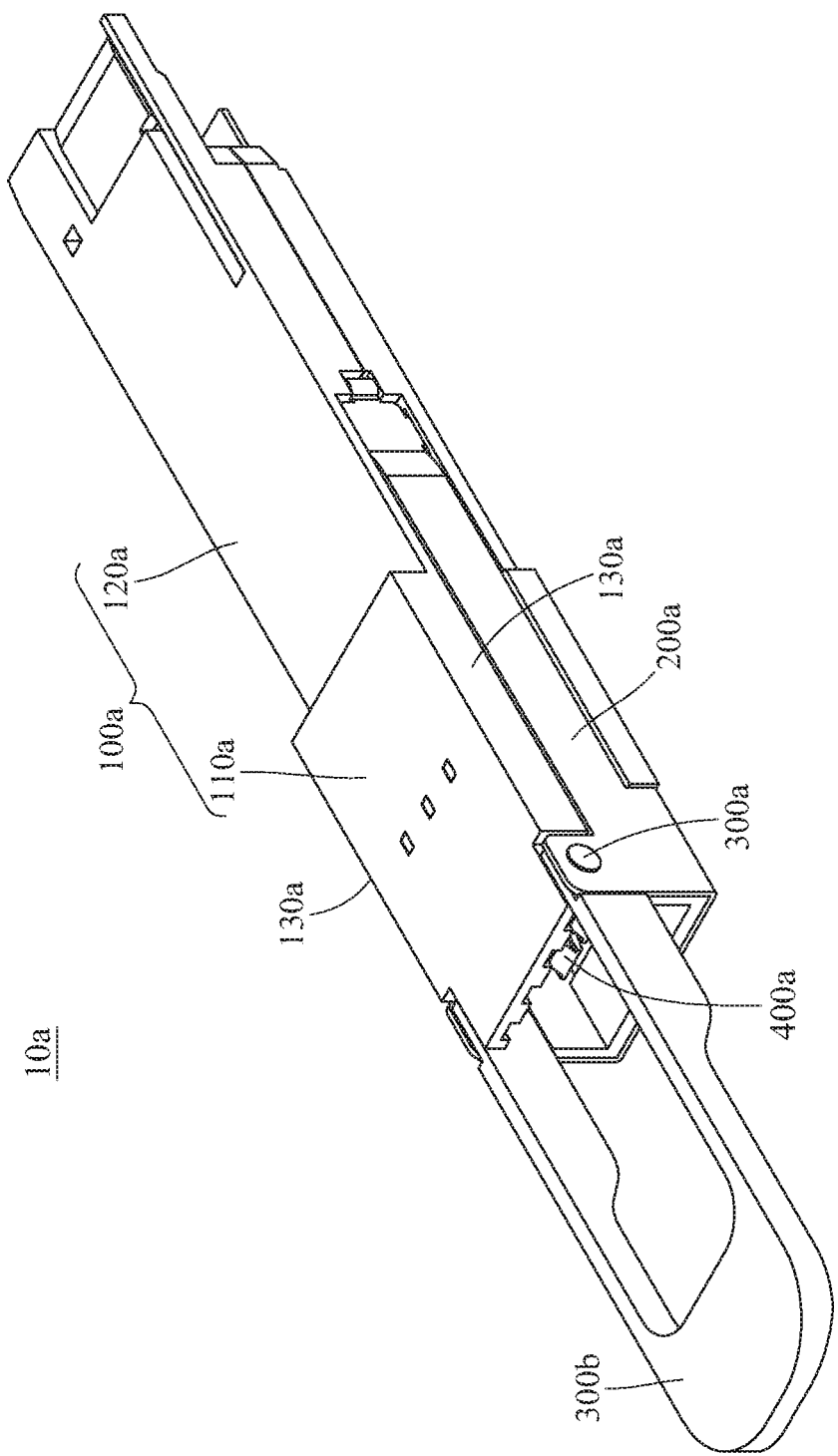
FIG. 3 is a perspective view of an optical transceiver according to a second embodiment of the present disclosure.
Figure 4:
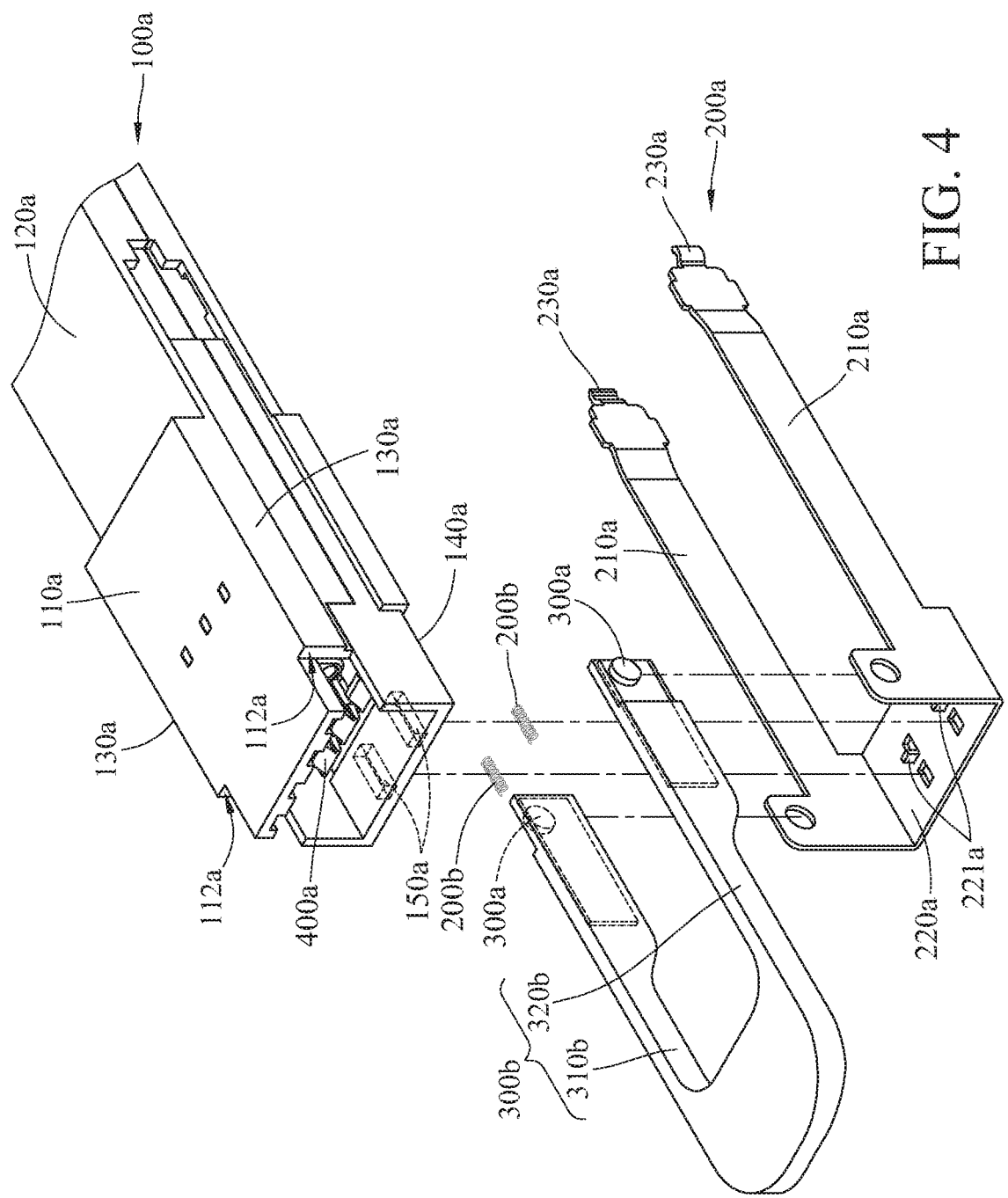
FIG. 4 is an exploded view of the optical transceiver in FIG. 3.

Please refer to FIG. 3 and FIG. 4. FIG. 3 is a perspective view of an optical transceiver according to a second embodiment of the present disclosure. FIG. 4 is an exploded view of the optical transceiver in FIG. 3. According to the present disclosure, in the second embodiment, an optical transceiver 10a is disclosed, and the optical transceiver 10a includes a housing 100a, a fastening component 200a, two elastic components 200b, two pivot shafts 300a, a bail 300b and an optical connector 400a.

The housing 100a includes a head portion 110a and an insertion portion 120a connected with each other. The head portion 110a of the housing 100a includes two lateral surfaces 130a. A sliding rail is formed on each of the two lateral surfaces 130a and extends from the head portion 110a to the insertion portion 120a.

The fastening component 200a includes two extending arms 210a movably disposed on the sliding rails at the lateral surfaces 130a, respectively. Each of the extending arms 210a includes a fastening portion 230a. The fastening component 200a is movable relative to the housing 100a, and the fastening portion 230a is able to be fastened with a cage. Each of the elastic components 200b, for example, is a compression spring disposed on the housing 100a. The elastic components 200b are configured to apply force on the fastening component 200a so as to secure the fastening portion 230a firmly to the cage. It is worth noting that the number of the elastic components 200b is not limited by the embodiments discussed in the present disclosure.

The pivot shafts 300a are separately disposed on the fastening component 200a. In one embodiment, the two pivot shafts 300a are respectively disposed on the two extending arms 210a of the fastening component 200a. The two pivot shafts 300a are respectively located on opposite sides of the housing 100a.

The bail 300b includes a first connecting portion 310b and a second connecting portion 320b. The first connecting portion 310b is pivoted with respect to one extending arm 210a of the fastening component 200a via one pivot shaft 300a. The second connecting portion 320b is pivoted with respect to the other extending arm 210a of the fastening component 200a via the other pivot shaft 300a. The optical connector 400a is disposed in the head portion 110a of the housing 100a.

Figure 5:
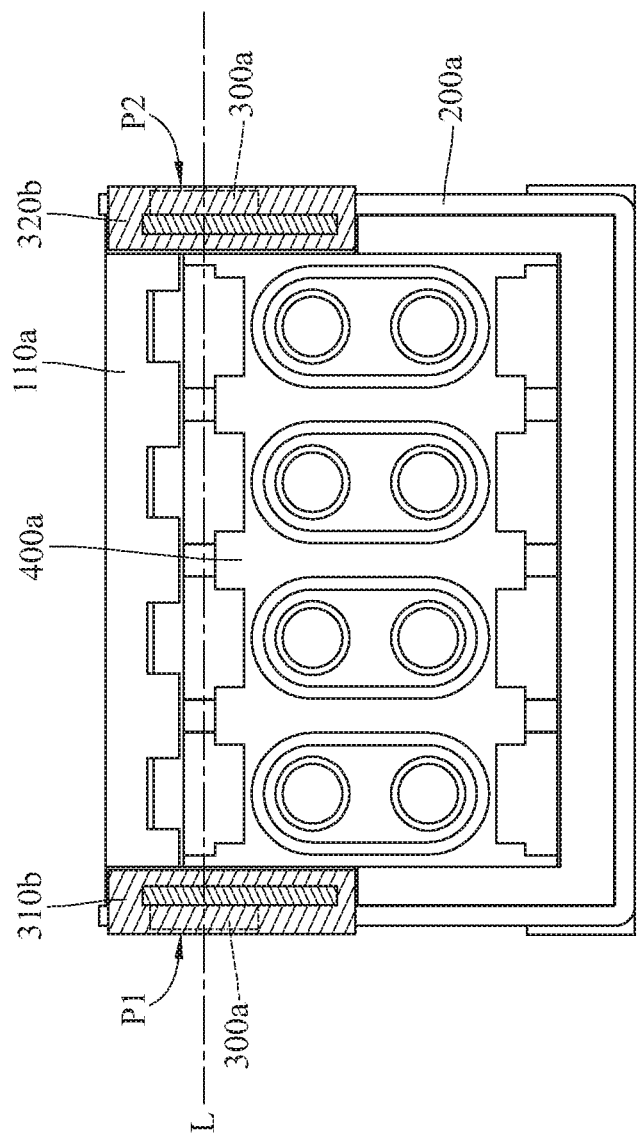
FIG. 5 is a front view of the optical transceiver in FIG. 3.
Figure 6:
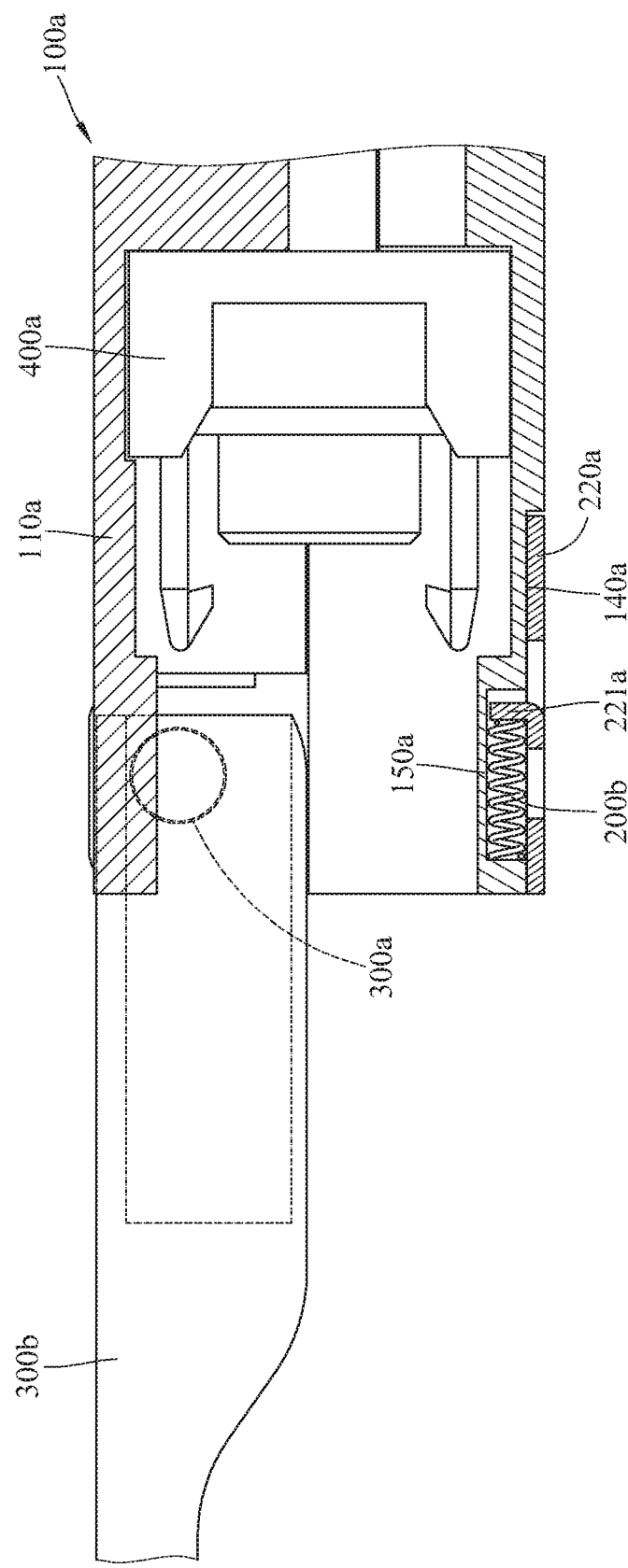
FIG. 6 is a cross-sectional view of the optical transceiver in FIG. 3.
Figure 7:
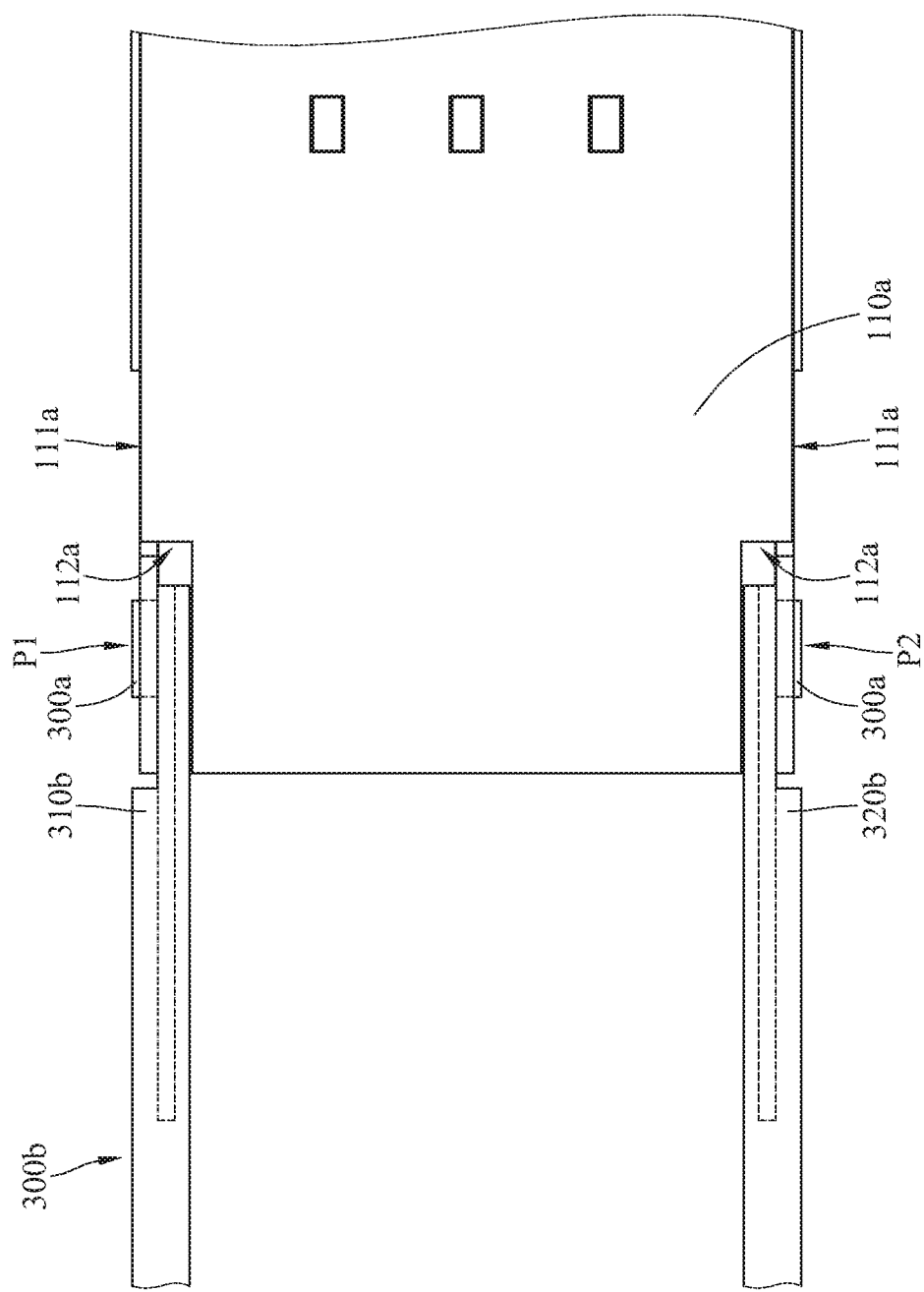
FIG. 7 is a top view of the optical transceiver in FIG. 3.

Please further refer to FIG. 5 through FIG. 7. FIG. 5 is a front view of the optical transceiver in FIG. 3. FIG. 6 is a cross-sectional view of the optical transceiver in FIG. 3. FIG. 7 is a top view of the optical transceiver in FIG. 3.

As shown in FIG. 4 and FIG. 5, the two pivot shafts 300a disposed on the fastening component 200a define a first pivot joint P1 and a second pivot joint P2. The first connecting portion 310b of the bail 300b is pivoted with respect to the fastening component 200a at the first pivot joint P1, and the second connecting portion 320b is pivoted with respect to the fastening component 200a at the second pivot joint P2. The optical connector 400a is located between the first pivot joint P1 and the second pivot joint P2. That is, a connection line L between the first pivot joint P1 and the second pivot joint P2 passes through the head portion 110a of the housing 100a. It is worth noting that the configuration of the optical transceiver 10a is not limited by the embodiments discussed in the present disclosure. In some embodiments, the optical transceiver does not include pivot shaft; instead, the bail includes two pins connected with the first connecting portion and the second connecting portion, respectively, and the pins are pivoted with respect to the fastening component to define the first pivot joint and the second pivot joint.

According to one embodiment of the present disclosure, the fastening component 200a further includes a linkage arm 220a. As shown in FIG. 4 and FIG. 6, the linkage arm 220a is connected with the two extending arms 210a. The linkage arm 220a is disposed on the bottom surface 140a of the housing 100a and attached to the elastic components 200b. The lateral surface 130 and the bottom surface 140a are outer surfaces of the housing 100a.

According to one embodiment of the present disclosure, the elastic components 200b are disposed on the bottom surface 140a of the housing 100a. As shown in FIG. 4 and FIG. 6, two confine grooves 150a are formed on the bottom surface 140a of the housing 100a, and the elastic components 200b are respectively disposed in the confine grooves 150a. The linkage arm 220a of the fastening component 200a includes two confined portions 221a which respectively extend into the two confined grooves 150a in order to press the elastic components 200b. It is worth noting that the number of the confine grooves 150a and that of the confined portions 221a are not limited by the embodiments discussed in the present disclosure.

With a configuration that the linkage arm 220a of the fastening component 200a and the elastic components 200b are disposed on the bottom surface 140a of the housing 100a, more accommodation space inside the housing 100a could be provided to accommodate electronic components for high-speed communication, larger optical connector 400a and the pivot shafts 300a, thereby meeting the requirements of compact optical transceiver 10a and proper space utilization of the same.

As shown in FIG. 4 and FIG. 7, according to one embodiment of the present disclosure, two accommodation grooves 112a are respectively formed on opposite edges 111a of the head portion 110a of the housing 100a. The first connecting portion 310b and the second connecting portion 320b of the bail 300b respectively extend into the two accommodation grooves 112a. Therefore, the first pivot joint P1 and the second pivot joint P2 are formed at a position lower than the top surface of the housing 100a so as to properly manage the height of the optical transceiver 10a and the entire size of the same accordingly.

According to the present disclosure, the bail includes a first connecting portion pivoted with respect to the fastening component at a first pivot joint and a second connecting portion pivoted with respect to the fastening component at a second pivot joint. In some embodiments, the connection line between the first pivot joint and the second pivot joint passes through the housing. In some embodiments, two pivot shafts are disposed on the fastening component to define the first pivot joint and the second pivot joint. Therefore, more space could be provided in a vertical direction of the optical transceiver to accommodate a larger optical connector for receiving more optical fiber plugs (connectors/jumpers), thereby simultaneously meeting the requirements of small form factor and high-speed communication.

The embodiments are chosen and described in order to best explain the principles of the present disclosure and its practical applications, to thereby enable others skilled in the art to best utilize the present disclosure and various embodiments with various modifications as are suited to the particular use that is being contemplated. It is intended that the scope of the present disclosure is defined by the following claims and their equivalents.

What is claimed is:

1. An optical transceiver, configured to be inserted into a cage in pluggable manner, comprising:
   a housing;
   a fastening component movably disposed on the housing and configured to be detachably fastened with the cage; the fastening component comprises two extending arms and a linkage arm, the linkage arm is connected between the two extending arms, the two extending arms are respectively disposed on opposite lateral surfaces of the housing;
   two pivot shafts separately disposed on the fastening component, the two pivot shafts being respectively located on opposite sides of the housing; and
   a bail comprising a first connecting portion and a second connecting portion, the first connecting portion being pivoted with respect to one of the two extending arms via one of the two pivot shafts, the second connecting portion being pivoted with respect to the other one of the two extending arms via the other one of the two pivot shafts;
   and a confine groove is formed on a bottom surface of the housing, and a elastic component is disposed in the confine groove, and the fastening component comprises a confined portion extending into the confined groove in order to press the elastic component.

2. The optical transceiver according to claim 1, further comprising an optical connector disposed in the housing.

3. The optical transceiver according to claim 1, wherein two accommodation grooves are respectively formed on opposite edges of the housing, the first connecting portion and the second connecting portion of the bail respectively extend into the two accommodation grooves.

4. The optical transceiver according to claim 1, wherein the optical transceiver is a QSFP-DD (Quad Small Form-factor Pluggable Double Density) optical transceiver.

5. An optical transceiver, configured to be inserted into a cage in pluggable manner, comprising:
   a housing;
   a fastening component movably disposed on the housing and configured to be detachably fastened with the cage; the fastening component comprises two extending arms and a linkage arm, the linkage arm is connected between the two extending arms, the two extending arms are respectively disposed on opposite lateral surfaces of the housing; and
   a bail comprising a first connecting portion and a second connecting portion, the first connecting portion being pivoted with respect to one of the two extending arms at a first pivot joint, the second connecting portion being pivoted with respect to other one of the two extending arms at a second pivot joint, and a connection line between the first pivot joint and the second pivot joint passing through the housing; and a confine groove is formed on a bottom surface of the housing, and a elastic component is disposed in the confine groove, and the fastening component comprises a confined portion extending into the confined groove in order to press the elastic component.

6. The optical transceiver according to claim 5, further comprising an optical connector disposed in the housing.

7. The optical transceiver according to claim 5, wherein the optical transceiver is a QSFP-DD (Quad Small Form-factor Pluggable Double Density) optical transceiver.

* * * * *